United States Patent
Miura

(10) Patent No.: US 9,084,967 B2
(45) Date of Patent: Jul. 21, 2015

(54) OXYGEN ADSORBENT BASED ON LANTHANOIDE OXYSULFATE, METHOD FOR PRODUCING IT, AND EXHAUST GAS PURIFYING CATALYST CONTAINING IT

(75) Inventor: Masahide Miura, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 281 days.

(21) Appl. No.: 13/502,756

(22) PCT Filed: Oct. 27, 2010

(86) PCT No.: PCT/IB2010/002869
§ 371 (c)(1),
(2), (4) Date: Apr. 19, 2012

(87) PCT Pub. No.: WO2011/051803
PCT Pub. Date: May 5, 2011

(65) Prior Publication Data
US 2012/0214665 A1 Aug. 23, 2012

(30) Foreign Application Priority Data
Oct. 29, 2009 (JP) ................. 2009-249340

(51) Int. Cl.
| | | |
|---|---|---|
| *B01J 27/053* | (2006.01) | |
| *B01D 53/94* | (2006.01) | |
| *B01J 20/06* | (2006.01) | |
| *B01J 21/06* | (2006.01) | |
| *B01J 23/63* | (2006.01) | |
| *B01J 35/04* | (2006.01) | |
| *B01J 37/02* | (2006.01) | |
| *B01J 37/03* | (2006.01) | |

(52) U.S. Cl.
CPC ............. *B01D 53/945* (2013.01); *B01J 20/06* (2013.01); *B01J 21/066* (2013.01); *B01J 23/63* (2013.01); *B01J 35/04* (2013.01); *B01J 37/0201* (2013.01); *B01J 37/0215* (2013.01); *B01J 37/0244* (2013.01); *B01J 37/0248* (2013.01); *B01J 37/038* (2013.01); *B01D 2255/1021* (2013.01); *B01D 2255/1023* (2013.01); *B01D 2255/206* (2013.01); *B01D 2255/2092* (2013.01); *B01D 2255/407* (2013.01); *B01D 2255/908* (2013.01); *Y02T 10/22* (2013.01)

(58) Field of Classification Search
None
See application file for complete search history.

(56) References Cited

U.S. PATENT DOCUMENTS

2001/0036901 A1* 11/2001 Koda et al. ............ 502/304
2008/0000222 A1 1/2008 Hirata

FOREIGN PATENT DOCUMENTS

| JP | 2005-87891 | 4/2005 |
|---|---|---|
| JP | 2005-87892 | 4/2005 |

(Continued)

OTHER PUBLICATIONS

International Search Report in International Application No. PCT/IB2010/002869; Mailing Date: Feb. 11, 2011.

(Continued)

*Primary Examiner* — Melissa Swain
(74) *Attorney, Agent, or Firm* — Finnegan, Henderson, Farabow, Garrett & Dunner, LLP

(57) ABSTRACT

An oxygen adsorbent that includes $Ln_2O_2SO_4$, wherein Ln represents a rare earth element, and a ceria composite oxide, and an exhaust gas purifying catalyst that includes the oxygen adsorbent.

9 Claims, 4 Drawing Sheets

(56) References Cited

FOREIGN PATENT DOCUMENTS

| | | |
|---|---|---|
| JP | 2006-75716 | 3/2006 |
| JP | 2008-284512 | 11/2008 |
| JP | 2010-63949 | 3/2010 |
| WO | WO 2008/143341 A1 | 11/2008 |

OTHER PUBLICATIONS

Written Opinion of the International Searching Authority in International Application No. PCT/IB2010/002869; Mailing Date: Feb. 11, 2011.

K. Ikeue et al., "Large-capacity Oxygen Storage of Pd-loaded $Pr_2O_2SO_4$ Applied to Anaerobic Catalytic CO Oxidation", Journal of Catalysis, vol. 248, No. 1, pp. 46-52 (2007).

K. Ikeue et al., "X-ray Structural Study on the Different Redox Behavior of La and Pr Oxysulfates/Oxysulfides," Journal of Alloys and Compounds, vol. 451, No. 1-2, pp. 338-340 (2008).

Applicant's Amendment in International Application No. PCT/IB2010/002869 (Aug. 26, 2011).

Applicant's Supplemental Amendment in International Application No. PCT/IB2010/002869 (Aug. 30, 2011).

* cited by examiner

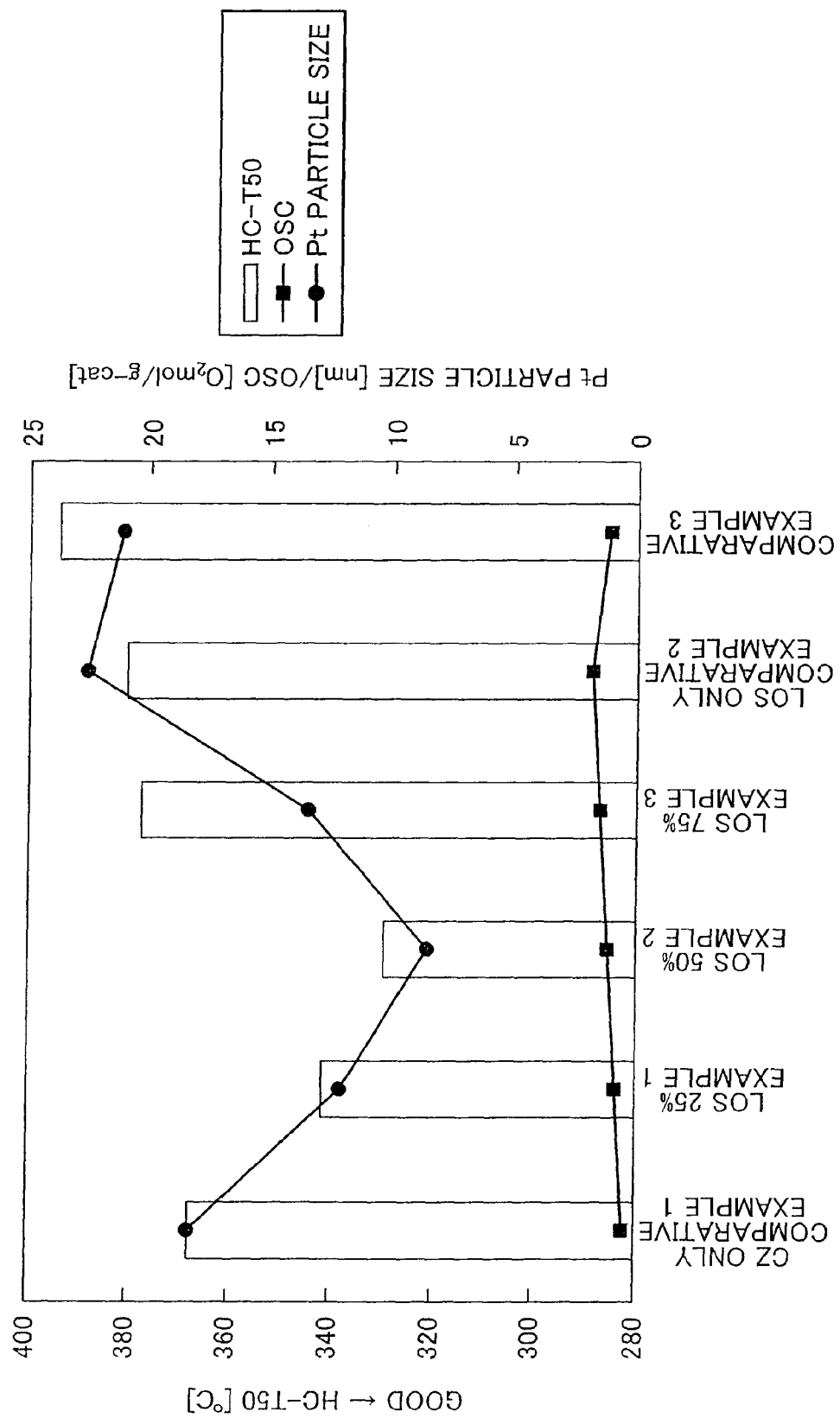

OXYGEN ADSORBENT BASED ON LANTHANOIDE OXYSULFATE, METHOD FOR PRODUCING IT, AND EXHAUST GAS PURIFYING CATALYST CONTAINING IT

CROSS-REFERENCE TO RELATED APPLICATIONS

This application is a national phase application of International Application No. PCT/IB2010/002869, filed Oct. 27, 2010, and claims the priority of Japanese Application No. 2009-249340, filed Oct. 29, 2009, the contents of both of which are incorporated herein by reference.

BACKGROUND OF THE INVENTION

1. Field of the Invention

The present invention relates to an oxygen adsorbent, to a method for producing the oxygen adsorbent, and to an exhaust gas purifying catalyst that utilizes the adsorbent. More specifically, the present invention is directed to an oxygen adsorbent that contains a ceria composite oxide, that has an oxygen adsorption capacity and a S (sulfur) poisoning resistance and that can prevent deterioration of a catalyst, to a method for producing the oxygen adsorbent, and to an exhaust gas purifying catalyst that contains the oxygen adsorbent.

2. Description of the Related Art

Exhaust gas discharged from an internal combustion contains HC (hydrocarbons), CO (carbon monoxide) and $NO_x$ (nitrogen oxides), and these pollutants are emitted into the atmosphere after being purified by an exhaust gas purifying catalyst. As a typical example of the exhaust gas purifying catalyst that is used for the purpose, a three-way catalyst that is composed of a porous oxide carrier such as $Al_2O_3$ (aluminum oxide), $SiO_2$ (silicon oxide), $ZrO_2$ (zirconium oxide) or $TiO_2$ (titanium oxide) and a precious metal, such as Pt (platinum), Rh (rhodium) or Pd (palladium), that is supported on the carrier is widely used.

The three-way catalyst oxidizes HC and CO in exhaust gas and also reduces $NO_x$ and can exhibit the highest effect in the purification of an exhaust gas of a stoichiometric gas atmosphere that has been generated by burning at nearly the theoretical air-fuel ratio. However, the exhaust gas atmosphere shifts to the rich or lean side because the actual air-fuel ratio shifts to the rich or lean side with respect to the stoichiometric air-fuel (A/F) ratio depending on the operating conditions of the automobile. Thus, a high purification performance cannot be necessarily only obtained with a three-way catalyst that is configured as described above. In particular, because requirements for improved fuel efficiency have become more common in recent years, there is an increasing opportunity for an exhaust gas purifying catalyst to be exposed to sudden fluctuations of atmosphere due to fluctuations of the air-fuel ratio under high temperatures that are caused by, for example, an increase of the number of times of fuel cut (FC) at a high temperature. Such sudden fluctuations of atmosphere can significantly accelerate deterioration of the catalyst.

Thus, to enhance the exhaust gas purification ability of a three-way catalyst by compensating for fluctuations in oxygen concentration of the exhaust gas, an oxygen adsorbent that occludes oxygen when the oxygen concentration in the exhaust gas is high and releases oxygen when the oxygen concentration in the exhaust gas is low, is used in exhaust gas purifying catalysts. Well-known examples of the oxygen adsorbent include ceria ($CeO_2$) and ceria composite oxide, that is, $CeO_2$—$ZrO_2$ composite oxide. Such oxygen adsorbents are an important constituent material for an automobile exhaust gas purifying catalyst to compensate for fluctuations in A/F ratio and to maintain an atmosphere in which the catalyst can act in the most effective manner. In order to purify the exhaust gas more stably, an oxygen adsorbent that adsorbs a larger amount of oxygen is desired. This is the reason why a lanthanoide oxysulfate ($Ln_2O_2SO_4$), which can in theory reversibly adsorb eight times the amount of oxygen per molecule than $CeO_2$ or a ceria composite oxide is attracting attention. However, because exhaust gas from the engine of an automobile contains sulfur components, such as sulfur oxides that includes $SO_2$ (sulfur dioxide) and $SO_3$ (sulfur trioxide), the oxygen adsorbent must be resistant to sulfur-poisoning (S-poisoning).

Japanese Patent Application Publication No. 2005-87891 (JP-A-2005-87891) describes a purifying catalyst that is provided with a perovskite-type composite oxide, represented by the formula $A_xB_{2-x}CO_{4-y}(SO_4)_y$ (where A represents a rare earth element, B represents an alkaline-earth metal, C represents a transition metal, $1 \le x < 2$ and $0 < y \le 1$), that is immune to S-poisoning. Japanese Patent Application Publication No. 2005-87892 (JP-A-2005-87892) describes a catalyst that includes an oxygen adsorbent composed of an oxysulfate of a rare earth, represented by $A_2O_2SO_4$ (where A represents a rare earth element), and a precious metal that is supported on the oxygen adsorbent. The catalyst described in JP-A-2005-87892 has a higher oxygen adsorption capacity than conventional catalysts composed of a $CeO_2$—$ZrO_2$ composite oxide on which a precious metal is supported. Japanese Patent Application Publication No. 2006-75716 (JP-A-2006-75716) describes an exhaust gas purifying catalyst, which includes a first oxygen adsorbent composed of a compound represented by $A_2O_2SO_4$ (where A represents a rare earth element), and an $NO_x$ occluding material that supports a precious metal. The catalyst described in JP-A-2006-75716 has a high oxygen adsorption capacity under high temperature, and demonstrates the use of the first oxygen adsorbent in combination with a second oxygen adsorbent such as $CeO_2$ or a $CeO_2$—$ZrO_2$ composite oxide. However, no specific example in which a $CeO_2$—$ZrO_2$ composite oxide is used as the second oxygen adsorbent is described. In addition, Japanese Patent Application Publication No. 2008-284512 (JP-A-2008-284512) describes an oxygen adsorbent that includes a compound composed of $Pr_2O_2SO_4$ and/or $Pr_2O_2S$ in which at least a portion of the Pr (praseodymium) is substituted by Ce (cerium), and an exhaust gas purifying catalyst that includes the oxygen adsorbent and a metal that is supported on the oxygen adsorbent.

However, the oxygen adsorbents that are described in these Patent Documents do not have a sufficient oxygen adsorption capacity, so that there is no alternative but to use a large amount of the catalyst. This is the reason why an oxygen adsorbent that has a higher oxygen adsorption capacity is desired.

SUMMARY OF THE INVENTION

The present invention provides an oxygen adsorbent that adsorbs oxygen and resists sulfur poisoning, and an exhaust gas purifying catalyst. A first aspect of the present invention provides an oxygen adsorbent that includes $Ln_2O_2SO_4$, wherein Ln represents a rare earth element, that is mixed with a ceria composite oxide. A second aspect of the present invention provides an exhaust gas purifying catalyst that includes the oxygen adsorbent. A third aspect of the present invention provides a method for producing an oxygen adsorbent that includes mixing $Ln_2O_2SO_4$ with a ceria composite oxide. In the above aspects, the term "ceria composite oxide" refers to a powder, that is, secondary particles, of a $CeO_2$—$ZrO_2$ solid solution.

According to the above aspects, an oxygen adsorbent that has an oxygen adsorption capacity and S-poisoning resistance can be obtained. In particular, the oxygen adsorbent, on which one or more metal elements selected from Pt, Pd, Rh and Fe (iron), has a higher oxygen adsorption capacity. In addition, according to the above aspects, because the oxygen adsorbent has an oxygen adsorption capacity and S-poisoning resistance it is possible to obtain an exhaust gas purifying catalyst that can exhibit a stable catalytic performance and suppress sintering of a precious metal catalyst even in a high temperature environment in which the exhaust gas atmosphere fluctuates and which contains sulfur oxides.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 7 is a graph that compares the performance of exhaust gas purifying catalysts to which oxygen adsorbents that were produced in Examples according to the present invention against those produced in the Comparative Examples.

DETAILED DESCRIPTION OF EMBODIMENTS

Figure 1:
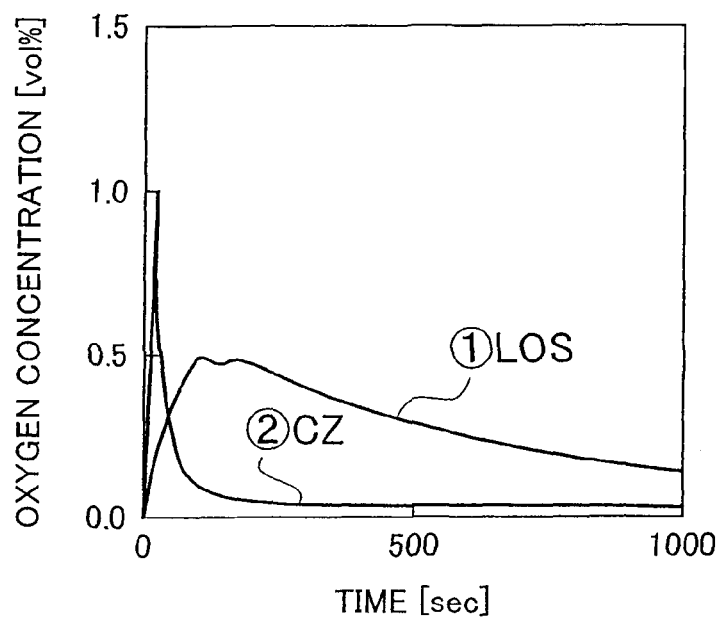
FIG. 1 is a graph showing the oxygen adsorption capacity of an oxygen adsorbent according to the related art.
Figure 2:
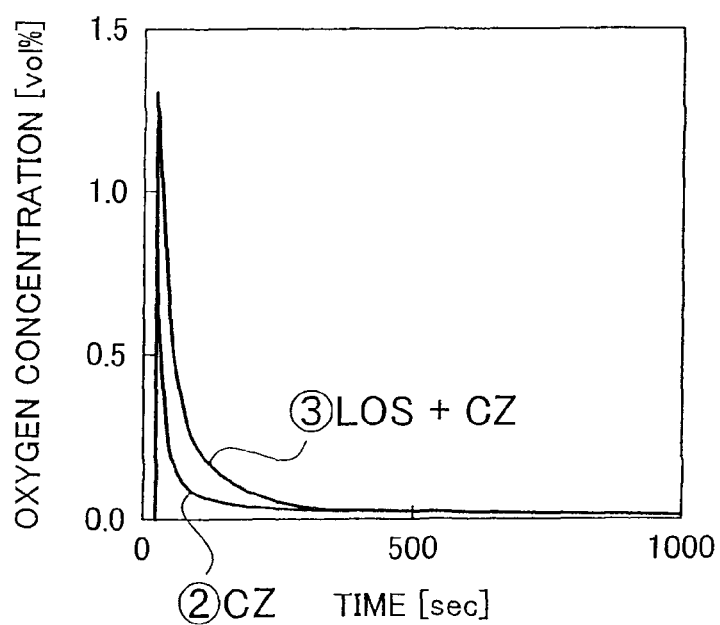
FIG. 2 is a graph that shows a comparison of the oxygen adsorption capacities of the oxygen adsorbent according to one embodiment of the present invention and of a convention oxygen adsorbent.

An embodiment of the present invention is described below with reference to FIG. 1 to FIG. 7. In FIG. 1, two types of oxygen adsorbents, i.e., 0.5 wt %-Pt/LOS and 0.5 wt %-Pt/CZ, were each produced using 3 g of pellets as a sample, and catalysts with a ratio of each oxygen adsorbent to $Al_2O_3$ of 100:27 (wt %) were produced. In a test, gases were introduced (10 L/min) in the order of 1% $O_2/N_2$ (30 minutes)→($N_2$ purge)→2% $CO/N_2$ (30 minutes), 600° C. (bed temperature), to observe the CO oxidation reaction in the lattice of the oxygen adsorbent. In FIG. 2, as in the case with FIG. 1, an oxygen adsorbent with CZ:LOS=50:50 (wt %) was produced using 3 g of pellets, and a catalyst with a ratio of the oxygen adsorbent to $Al_2O_3$ of 100:27 (wt %) was produced. In a test, gases were introduced (10 L/min) in the order of 1% $O_2/N_2$ (30 minutes)→($N_2$ purge)→2% $CO/N_2$ (30 minutes), 600° C. (bed temperature), to observe the CO oxidation reaction in the lattice oxygen of the oxygen adsorbent. As shown in FIG. 1, LOS, which is a conventional oxygen adsorbent, has a large $O_2$ desorbing capacity, but requires a long time to desorb $O_2$ and cannot quickly compensate for sudden fluctuations of the atmosphere. Thus, LOS cannot be practically used as an oxygen adsorbent. In contrast, CZ, which is another a conventional oxygen adsorbent, rapidly desorbs $O_2$ but soon becomes unable to desorb $O_2$. In contrast, as shown in FIG. 2, the oxygen adsorbent according to an embodiment of the present invention continues to desorb $O_2$ even after rapidly releasing $O_2$. Therefore, the oxygen adsorbent according to an embodiment of the present invention is able to compensate for sudden fluctuations in the A/F ratio of the atmosphere.

Figure 3:
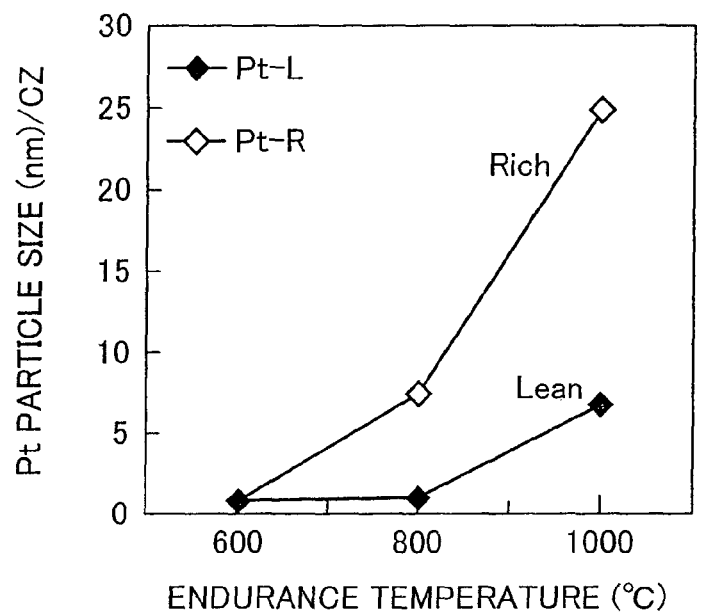
FIG. 3 is a graph showing the degree of sintering of an precious metal catalyst of a related art in exhaust gas atmospheres on the rich and lean sides
Figure 4:
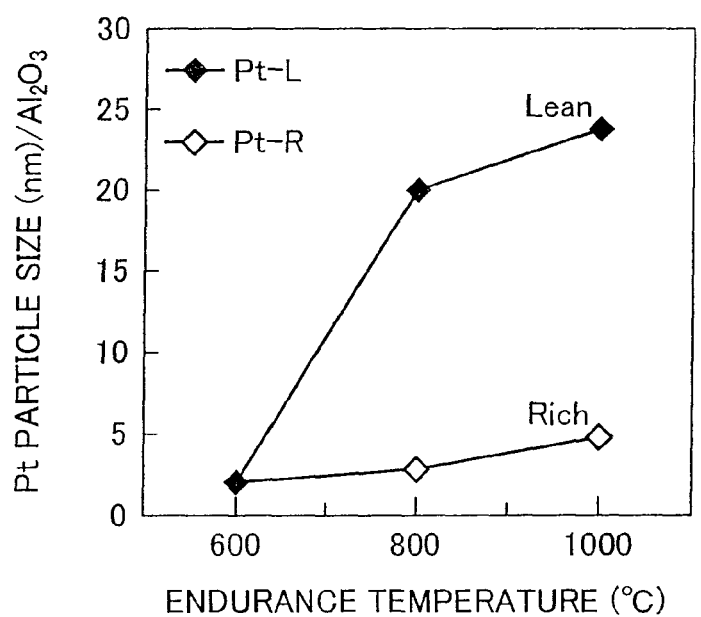
FIG. 4 is a graph showing the degree of sintering of a precious metal catalyst of another related art in exhaust gas atmospheres on the rich and lean sides.
Figure 5:
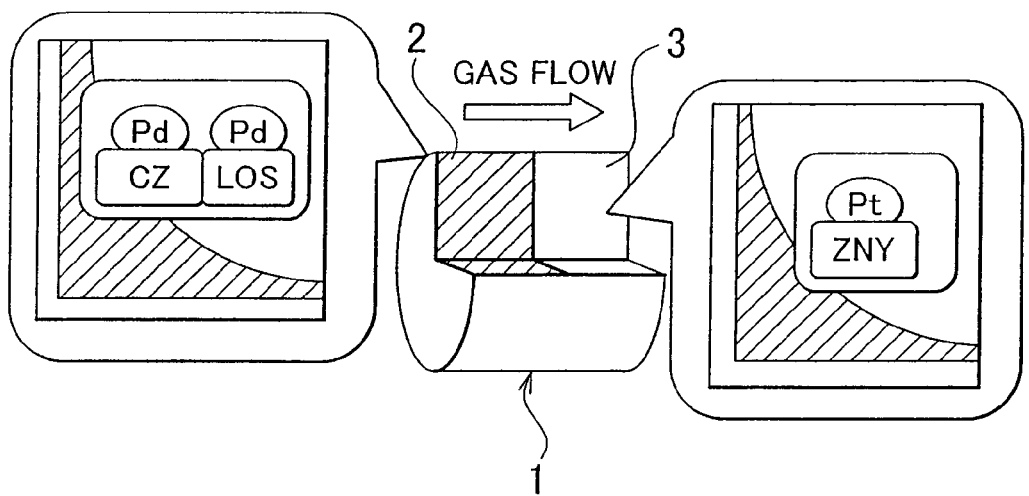
FIG. 5 is a partially cross-sectional schematic view of an embodiment of an exhaust gas purifying catalyst that contains an oxygen adsorbent according to an embodiment of the present invention.
Figure 6:
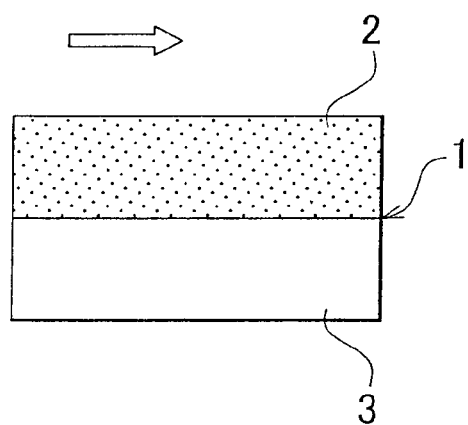
FIG. 6 is a schematic view of another embodiment of the exhaust gas purifying catalyst that contains the oxygen adsorbent according to the embodiment of the present invention.

In FIG. 3 and FIG. 4, two types of catalysts, i.e., "1 wt %-Pt×CZ, $Al_2O_3$" and "1 wt %-Pt/CZ, $Al_2O_3$", were used as samples, and, as an endurance test, the catalysts were subjected to air calcination under a lean atmosphere at a selected temperature for 5 hours in an electric furnace and then exposed to 3%-$CO/N_2$ (5 L/min) under a rich atmosphere at a selected temperature for 5 hours. In FIG. 3, Pt particles are supported on a CZ carrier as a sample of the exhaust gas purifying catalyst, and in FIG. 4, Pt particles are supported on an $Al_2O_3$ carrier as a sample of the exhaust gas purifying catalyst. Then, the particle size of the precious metal was measured by low temperature 0° C.-CO pulse measurement As shown in FIG. 3 and FIG. 4, if no oxygen adsorbent is used, deterioration of the catalyst is remarkable especially under a rich atmosphere in the exhaust gas purifying catalyst in which Pt particles are supported on a CZ carrier. Deterioration of the catalys is also remarkable under a lean atmosphere in the exhaust gas purifying catalyst in which Pt particles are supported on an $Al_2O_3$ carrier. Therefore, an exhaust gas purifying catalyst used in an exhaust gas atmosphere that fluctuates between rich and lean due to high-temperature operations undergoes significant deterioration irrespective of the carrier. However, as shown in FIG. 5 and FIG. 6, the exhaust gas purifying catalyst according to an embodiment of the present invention is constituted of a upstream A/F fluctuation absorbing section that contains an oxygen adsorbent on which a metal element, such as Pd, is supported and that is provided on the upstream-side of the exhaust gas purifying catalyst, that is, on the side where the concentration of pollutants in the exhaust gas is higher, and a downstream precious metal catalyst section that supports a precious metal, such as Pt, and that is provided on the downstream side, that is, on the side where the concentration of pollutants in the exhaust gas is lower. It is appreciated from FIG. 7 that, when applied to an exhaust gas purifying catalyst, the oxygen adsorbent according to an embodiment of the present invention may significantly suppress sintering of Pt in the downstream precious metal catalyst section in an endurance test using a sulfur oxide-containing atmosphere that fluctuates between rich and lean states in comparison to the oxygen adsorbents of Comparative Examples, which are described later.

The suppressing effect of the oxygen adsorbent according to an embodiment of the present invention on sintering of the precious metal in the precious metal catalyst section in the above atmosphere, that is, a sulfur oxide-containing atmosphere that fluctuate between rich and lean states, has not yet been theoretically elucidated. However, it is inferred that such an effect is achieved because an oxygen adsorbent that contains a high percentage of a ceria composite oxide can be obtained by the present invention so that not only the property of the ceria composite oxide of being resistant to heat and better in the oxygen adsorption capacity performance than $CeO_2$ but also the property of $La_2O_2SO_4$ of not being poisoned by S in sulfur oxides is exhibited.

In the oxygen adsorbent of an embodiment of the present invention, the content of the ceria composite oxide may be higher than 20% by mass, preferably 25 to 75% by mass, more preferably 40 to 60% by mass, with respect to the total amount of the $Ln_2O_2SO_4$ and ceria composite oxide. If the content of the ceria composite oxide is 20% by mass or lower, the suppression of sintering of the precious metal, such as Pt, in the exhaust gas purifying catalyst in the presence of sulfur oxides is reduced. If the content of the ceria composite oxide is excessively high, on the other hand, the oxygen adsorbent tends to be poisoned by S of the sulfur oxides.

Examples of the $Ln_2O_2SO_4$ for use in an embodiment of the present invention include $La_2O_2SO_4$, $Ce_2O_2SO_4$, $Pr_2O2SO_4$, $Nd_2O_2SO_4$, $Pm_2O_2SO_4$, $Sm_2O_2SO_4$, and $Eu_2O_2SO_4$, and $La_2O_2SO_4$ may be preferably used. The $Ln_2O_2SO_4$ is usually used in the form of fine particles. Also, examples of the ceria composite oxide for use in an embodiment of the present invention include ceria-zirconia ($CeO_2$—$ZrO_2$) solid solution, such as secondary particles with a primary particle size of 3 to 50 nal. Other examples of the ceria composite oxide suitable for use in an embodiment of the present invention include secondary particles of a solid solution of the above three elements, i.e., Ce, Zr, and O (oxygen), and secondary particles of a solid solution of four or more elements that include one or more rare earth elements, such as Y (yttrium) and Nd (neodymium), in addition to the above three elements. The amount of the rare earth element, such as Y or Nd, may be in the range of 0.2 atom, such as 0.01 to 0.2 atom, especially in the range of 0.025 to 0.15 atom, per atom of the total of Ce and Zr.

The oxygen adsorbent of an embodiment of the present invention may be produced by mixing the $Ln_2O_2SO_4$ as described above and the ceria composite oxide as described above. In other words, the oxygen adsorbent according to an embodiment of the present invention may be a mixture of the $Ln_2O_2SO_4$ and the ceria composite oxide with a high concentration of the ceria composite oxide that has been formed into secondary particles.

The oxygen adsorbent according to an embodiment of the present invention may contain, in addition to the $Ln_2O_2SO_4$ and the ceria composite oxide, a porous oxide, such as $Al_2O_3$. The amount of the porous oxide may be in the range of 50 parts by mass or less, for example 1 to 50 parts by mass, per 100 parts by mass of the total amount of the $Ln_2O_2SO_4$ and ceria composite oxide. Also, as an embodiment of the oxygen adsorbent according to an embodiment of the present invention, there may be mentioned an oxygen adsorbent comprised of the above components and that additionally supports one or more metal elements selected from the group consisting of Pt, Pd, Rh, and Fe. Such an embodiment may be an oxygen adsorbent in which the total supporting amount of the one or more metal elements that are selected from the group that consists of Pt, Pd, Rh, and Fe is in the range of 0.1 to 5 parts by mass, particularly 0.25 to 2 parts by mass, per 100 parts by mass of the total amount of the $Ln_2O_2SO_4$ and ceria composite oxide. The oxygen adsorption capacity is increased by supporting the one or more metal elements that are selected from the group consisting of Pt, Pd, Rh, and Fe.

The oxygen adsorbent according to an embodiment of the present invention may be produced by, for example, the following method. First, a nitrate of Ln that can provide $Ln_2O_2SO_4$, such as $Ln(NO_3)_3 \cdot 9H_2O$, and a long-chain alkyl sulfate, such as sodium dodecyl sulfate (which will be occasionally abbreviated to "SDS"), in an aqueous alkaline solution, such as an aqueous ammonia solution, are heated and reacted with stirring. The reaction mixture is thereafter cooled to obtain a precipitate. The precipitate is separated and dried to obtain a powder. The powder is then calcined in the air by, for example, heating at a temperature of 500° C. or higher for several hours to obtain $Ln_2O_2SO_4$ in the form of a powder. Separately, salts of metals that can provide a ceria composite oxide, such as cerium diammonium nitrate, zirconium oxynitrate and, optionally, a nitrate of a rare earth element, such as yttrium nitrate or neodymium nitrate, are heated and reacted in an aqueous alkaline solution, such as an aqueous ammonia solution, with stirring. The reaction mixture is thereafter cooled to obtain a precipitate. The precipitate is separated and dried to obtain a powder. The powder is then calcined in the air by, for example, heating at a temperature of 500° C. or higher for several hours. The calcination product is pulverized to obtain secondary particles of the ceria composite oxide. The $Ln_2O_2SO_4$ powder and ceria composite oxide that are thus obtained, and, optionally, another porous oxide, such as alumina, and a precious metal salt that provides a precious metal catalyst, such as palladium nitrate, are uniformly mixed in water to prepare a slurry, and the precipitate is separated. Then, the powder obtained by drying the slurry is calcined in the air by, for example, heating at a temperature of 500° C. or higher for several hours, whereby an oxygen adsorbent according to an embodiment of the present invention is produced.

The exhaust gas purifying catalyst according to an embodiment of the present invention contains the above oxygen adsorbent as a component, and may contain other components in addition to the oxygen adsorbent depending on the intended application. The exhaust gas purifying catalyst according to an embodiment of the present invention may also be formed into an exhaust gas purifying catalyst by combining it with, for example, a precious metal catalyst member. For example, the exhaust gas purifying catalyst according to an embodiment of the present invention may be an exhaust gas purifying catalyst that contains the oxygen adsorbent on the upstream side of the catalyst. For example, as shown in FIG. 5 or FIG. 6, the exhaust gas purifying catalyst may be constituted of an upstream A/F fluctuation compensating section that contains an oxygen adsorbent on which a metal element, such as Pd, is supported and that is provided in the exhaust gas "upstream side of the exhaust gas purifying catalyst, that is, on the side where the pollutant concentration in the exhaust gas is higher, and a downstream precious metal catalyst section that supports a precious metal, such as Pt, and that is provided on the downstream side, that is, on the side where the pollutant concentration in the exhaust gas is lower. An exhaust gas purifying catalyst using two or more members that contain the oxygen adsorbent according to an embodiment of the present invention that constitutes such an exhaust gas purifying catalyst may be preared using convention methods that are understood in the field of this art.

In addition, the exhaust gas purifying catalyst according to an embodiment of the present invention may be produced by having the oxygen adsorbent, in combination with other components, supported on a catalyst substrate such as a honeycomb by, for example, a coating method. The honeycomb that is used as the catalyst substrate may be formed of a ceramic material such as cordierite or a stainless steel. In addition, the exhaust gas purifying catalyst according to an embodiment of the present invention may be formed in any shape.

Examples of the above-described components include an $NO_x$ occluding material and a catalytically active component. The $NO_x$ occluding material, which occludes and releases $NO_x$, may contain at least one element selected from alkaline metals, alkaline-earth metals, and rare earth elements. At least one metal that is selected from precious metals and transition metals may be used as the catalytically active component.

Examples of suitable precious metals include at least one element selected from Pt, Pd, Rh, and Ir (iridium). An example of a suitable transition metal that is used as the catalytically active component includes Ni (nickel). If one or more metal elements selected from the group consisting of Pt, Pd, Rh, and Fe are supported on the oxygen adsorbent according to the embodiment of the present invention, the use of an additional catalytically active component is not needed, but an additional catalytically active component may be added from the viewpoint of catalytic activity.

A suitable material that may be used as the above-described $NO_x$ occluding material, such as Ba (barium), K (potassium), or Li (lithium), may be supported on the oxygen adsorbent together with the catalytically active component. The $NO_x$ occluding material may be supported by, for example, impregnating, by immersion, a solution of a salt of the above element, such as an aquedus acetic acid solution of the element, into a powdery oxygen adsorbent on which a catalytically active component is supported, and drying and calcining the impregnated powder. In same manner as described above, the $NO_x$ occluding material may be supported on a functional member other than the oxygen adsorbent. An exhaust gas purifying catalyst according to an embodiment of the present invention may be produced by depositing the catalytically active component and the $NO_x$ occluding material on the oxygen adsorbent or a functional member other than the oxygen adsorbent.

The exhaust gas purifying catalyst according to an embodiment of the present invention can achieve stable catalytic performance because the oxygen adsorbent reversibly adsorbs oxygen and resists S-poisoning, as described above.

Examples of the present invention are described below. The following examples are only for illustrative purpose, and should not be construed to limit the present invention. In each example, commercially available reagents were used except the following Ingredients 1 to 4.

1. Preparation of $LaO_2SO_4$

Lanthanum nitrate nonahydrate (manufactured by NACALAI TESQUE, INC.), sodium dodecyl sulfate (SDS), ammonia, and distilled water were charged in a separable flask at a molar ratio of 1 $La(NO_3)_3.9H_2O$:2 SDS:30 ammonia:60 water and continuously stirred. After stirring, a precipitate was obtained and subjected to centrifugal separation and reduced-pressure drying, and then pulverized into a powder form and calcined at 900° C. for 5 hours. The $LaO_2SO_4$ that was thus obtained is referred to as Ingredient 1.

2. Preparation of $(Ce_{0.495}Zr_{0.453}Y_{0.052})O_2$

Cerium diammonium nitrate (IV) $((NH_4)_2Ce(NO_3)_6)$ (manufactured by NACALAI TESQUE, INC.), zirconium oxynitrate dihydrate $(ZrO(NO_3)_2.2H_2O)$ (manufactured by NACALAI TESQUE, INC.), and yttrium nitrate hexahydrate $(Y(NO_3)_3.6H_2O)$ (manufactured by NACALAI TESQUE, INC.) were dissolved in distilled water at a ratio of 49.5:45.3:5.2 (mole %) The resulting aqueous solution is then poured into a 28% aqueous ammonia solution (which is manufactured by NACALAI TESQUE, INC.) that was being stirred by a mixer, and stirring was continued for 30 minutes. Next, the precipitate that was produced was filtered, dried in a degreasing furnace at 120° C. for 12 hours, and calcined in an electric furnace at 700° C. for 5 hours. The powder that was obtained was pulverized in a mortar, and the pulverized product is referred to as Ingredient 2.

3. Preparation of $(Zr_{0.82}Nd_{0.09}Y_{0.09})O_2$

Zirconium oxynitrate dihydrate $(ZrO(NO_3)_2.2H_2O)$ (which is manufactured by NACALAI TESQUE, INC.), neodymium (III) nitrate hexahydrate $(Nd(NO_3)_3.6H_2O)$ (which is manufactured by Kishida Chemical Co., Ltd.), and yttrium nitrate hexahydrate $(Y(NO_3)_3.6H_2O)$ (which is manufactured by NACALAI TESQUE, INC.) were dissolved in distilled water at a ratio of 82:9:9 (mole %). The resulting aqueous solution was poured into a 28% aqueous ammonia solution (which is manufactured by NACALAI TESQUE, INC.) that was being stirred by a mixer and stirring was continued for 30 minutes. Next, the precipitate that was produced was filtered, dried in a degreasing furnace at 120° C. for 12 hours, and calcined in an electric furnace at 700° C. for 5 hours. The powder that was obtained was pulverized in a mortar, and the pulverized product is referred to as Ingredient 3.

4. Preparation of 1.0% by Mass Pt Supporting $(Zr_{0.82}Nd_{0.09}Y_{0.09})O_2$

Using an aqueous platinum nitrate solution having a platinum content of 8.6% by mass, 1.0% by mass of Pt is supported on Ingredient 3 through an impregnation process. In the impregnation process, the powder after the impregnation is dried in a degreasing furnace at 120° C. for 12 hours and calcined in an electric furnace at 600° C. for 2 hours, and the powder that was thus obtained is referred to as Ingredient 4.

COMPARATIVE EXAMPLE 1

(1) Preparation of Upstream A/F Fluctuation Absorbing Section

In a 300 mL plastic beaker, 11.8 g of θ-$Al_2O_3$, 33.2 g of Ingredient 2, 0.7 g of an aluminum hydroxide powder, 15.1 g of a 40% aqueous aluminum nitrate solution, 48.9 g of "distilled water, and 8.2 g of an aqueous palladium nitrate solution having a Pd content of 8.2% by mass were stirred for 30 minutes with a mixer. Next, the mixture was mixed in a ball mill for 24 hours to prepare a slurry. The slurry was then uniformly poured into a 17.5 mL ceramic honeycomb (φ30 mm×L25 mm, 400 cells/4 mil=0.1 mm, which is manufactured by NGK INSULATORS, LTD.), and excess slurry was blown off. Then, the ceramic honeycomb was dried in a degreasing furnace at 250° C. for 2 hours and calcined in an electric furnace at 500° C. for 2 hours to produce the upstream section (Upstream section-1). The coating amount was adjusted to 5 (g/piece).

(2) Preparation of Downstream Pt Catalyst Section

In a 300 mL plastic beaker, 11.8 g of θ-$Al_2O_3$, 33.2 g of Ingredient 4, 0.7 g of an aluminum hydroxide powder, 15.1 g of a 40% aqueous aluminum nitrate solution, and 48.9 g of distilled" water were stirred for 30 minutes with a mixer. Next, the slurry that was thus obtained was uniformly poured into a 17.5 mL ceramic honeycomb (φ30 mm×L25 mm, 400 cells/4 mil=0.1 mm, which is manufactured by NGK INSULATORS, LTD.), and excess slurry was blown off. Then, the ceramic honeycomb was dried in a degreasing furnace at 250° C. for 2 hours and calcined in an electric furnace at 500° C. for 2 hours to produce the downstream Pt catalyst section. The coating amount was adjusted to 5 (g/piece).

(3) Preparation of Exhaust Gas Purifying Catalyst

The upstream A/F fluctuation compensating section and the downstream Pt catalyst section were provided on the exhaust gas receiving side and on the exhaust gas discharging side, respectively, as shown in FIG. 5 to obtain an exhaust gas purifying catalyst.

(4) Evaluation

The oxygen adsorption performance of the upstream A/F fluctuation compensation section and the exhaust gas purification performance of the exhaust gas purifying catalyst were evaluated. The results are summarized in Table 1 and FIG. 7 together with other results.

EXAMPLE 1

(1) Preparation of Upstream A/F Fluctuation Compensation Section

An upstream section (upstream section-2) was produced in the same manner as in Comparative Example 1 except that 11.8 g of θ-$Al_2O_3$, 8.3 g of Ingredient 1, 24.9 g of Ingredient 2, 0.7 g of an aluminum hydroxide powder, 15.1 g of a 40% aqueous aluminum nitrate solution, 48.9 g of distilled water, and 8.2 g of an aqueous palladium nitrate solution that had a Pd content of 8:2% by mass were stirred in a 300 mL plastic beaker with a mixer for 30 minutes. The coating amount was adjusted to 5 (g/piece).

(2) Preparation Downstream Pt Catalyst Section

A stream Pt catalyst section was formed in the same manner as in Comparative Example 1. The coating amount was adjusted to 5 (g/piece).

(3) Preparation of Exhaust Gas Purifying Catalyst

An exhaust gas purifying catalyst was obtained in the same manner as in Comparative Example 1 except that upstream-section-2 was used in place of upstreamsection-1 as the upstream A/F fluctuation compensating section.

(4) Evaluation

The oxygen adsorption performance of the upstream A/F fluctuation compensating section, and the exhaust gas purification performance of the exhaust gas purifying catalyst were evaluated. The results are summarized in Table 1 and FIG. 7 together with other results.

EXAMPLE 2

(1) Preparation of Upstream A/F Fluctuation Compensating Section

An upstream section (Upstream section-3) was produced in the same manner as in Comparative Example 1 except that 11.8 g of θ-$Al_2O_3$, 16.6 g of Ingredient 1, 16.6 g of Ingredient 2, 0.7 g of an aluminum hydroxide powder, 15.1 g, of a 40% aqueous aluminum nitrate solution, 48.9 g of distilled water, and 8.2 g of an aqueous palladium nitrate solution that had a Pd content of 8.2% by mass were stirred in a 300 mL plastic beaker with a mixer for 30 minutes. The coating amount was adjusted to 5 (g/piece).

(2) Preparation of Downstream Pt Catalyst Section

A downstream Pt catalyst section was obtained in the same manner as in Comparative Example 1. The coating amount was adjusted to 5 (g/piece).

(3) Preparation of Exhaust Gas Purifying Catalyst

An exhaust gas purifying catalyst was produced in the same manner as in Comparative Example 1 except that upstream section-3 was used in place of upstreamsection-1 as the upstream A/F fluctuation compensating section.

(4) Evaluation

The oxygen adsorption performance of the upstream A/F fluctuation absorbing section, and the exhaust gas purification performance of the exhaust gas purifying catalyst were evaluated. The results are summarized in Table 1 and FIG. 7 together with other results.

EXAMPLE 3

(1) Preparation of Upstream A/F Fluctuation Absorbing Section

"An upstream section (Upstream section-4) was produced in the same manner as in Comparative Example 1 except that 11.8 g of θ-$Al_2O_3$, 24.9 g of Ingredient 1, 8.3 g of Ingredient 2, 0.7 g of an aluminum hydroxide powder, 15.1 g of a 40% aqueous aluminum nitrate solution, 48.9 g of distilled water, and 8.2 g of an aqueous palladium nitrate solution that had a Pd content of 8.2% by mass were stirred in a 300 mL plastic beaker with a mixer for 30 minutes. The coating amount was adjusted to 5 (g/piece).

(2) Preparation of Downstream Pt Catalyst Section

A downstream Pt catalyst section was produced in the same manner as in Comparative Example 1. The coating amount was adjusted to 5 (g/piece).

(3) Preparation of Exhaust Gas Purifying Catalyst

An exhaust gas purifying catalyst was produced in the same manner as in Comparative Example 1 except that upstreamsection-4 was used in place of upstreamsection-1 as the upstream A/F fluctuation absorbing section.

(4) Evaluation

The oxygen adsorption performance of the upstream A/F fluctuation compensation section, and the exhaust gas purification performance of the exhaust gas purifying catalyst were evaluated. The results are summarized in Table 1 and FIG. 7 together with other results.

COMPARATIVE EXAMPLE 2

(1) Preparation of Upstream A/F Fluctuation Compensation Section

An upstream section (Upstream section-5) was produced in the same manner as in Comparative Example 1 except that 11.8 g of θ-$Al_2O_3$, 33.2 g of Ingredient 1, 0.7 g of an aluminum hydroxide powder, 15.1 g of a 40% aqueous aluminum nitrate solution, 48.9 g of distilled water, and 8.2 g of an aqueous palladium nitrate solution that had a Pd content of 8.2% by mass were stirred in a 300 mL plastic beaker with a mixer for 30 minutes. The coating amount was adjusted to 5 (g/piece).

(2) Preparation of Downstream Pt Catalyst Section

A downstream Pt catalyst section was produced in the same manner as in Comparative Example 1. The coating amount was adjusted to 5 (g/piece).

(3) Preparation of Exhaust Gas Purifying Catalyst

An exhaust gas purifying catalyst was produced in the same manner as in

Comparative Example 1 except that upstreamsection-5 was used in place of upstreamsection-1 as the upstream A/F fluctuation compensation section.

(4) Evaluation

The oxygen adsorption performance of the upstream A/F fluctuation compensation section, and the exhaust gas purification performance of the exhaust gas purifying catalyst were evaluated. The results are summarized in Table 1 and FIG. 7 together with other results.

COMPARATIVE EXAMPLE 3

(1) Preparation of Upstream A/F Fluctuation Absorbing Section

In a 300 mL plastic beaker, 11.8 g of θ-$Al_2O_3$, 33.2 g of Ingredient 1, 0.7 g of an aluminum hydroxide powder, 15.1 g of a 40% aqueous aluminum nitrate solution, 48.9 g of distilled water, and 8.2 g of an aqueous palladium nitrate solution that had a Pd content of 8.2% by mass were stirred for 30 minutes with a mixer. The resulting mixture was mixed in a ball mill for 24 hours to prepare a slurry. Next, the slurry was uniformly poured into a 17.5 mL ceramic honeycomb (φ30 mm×L25 mm, 400 cells/4 mil=0.1 mm, which is manufactured by NGK INSULATORS, LTD.), and excess slurry was blown off. Then, the ceramic honeycomb was dried in a degreasing furnace at 250° C. for 2 hours and calcined in an electric furnace at 500° C. for 2 hours. The coating amount of a lower layer was adjusted to 2.5 (g/piece). In addition, in a 300 mL plastic beaker, 11.8 g of θ-$Al_2O_3$, 33.2 g of Ingredient 2, 0.7 g of an aluminum hydroxide powder, 15.1 g of a 40% aqueous aluminum nitrate solution, and 48.9 g of distilled water were stirred for 30 minutes with a mixer. Next, the mixture was mixed in a ball mill for 24 hours to prepare a slurry. Thereafter, the slurry was uniformly poured into the above 17.5 mL ceramic honeycomb, on which the lower layer had been coated, and excess slurry was blown off. Then, the ceramic honeycomb was dried in a degreasing furnace at 250° C. for 2 hours and calcined in an electric furnace at 500° C. for 2 hours to obtain a upstream section (Upstream section-6). The coating amount on the upstream section (Upstream section-6) was adjusted to 5 (g/piece) including the lower layer.

(2) Preparation of Downstream Pt Catalyst Section

A downstream Pt catalyst section was produced in the same manner as in Comparative Example 1. The coating amount was adjusted to 5 (g/piece).

(3) Preparation of Exhaust Gas Purifying Catalyst

An exhaust gas purifying catalyst was produced in the same manner as in Comparative Example 1 except that upstreamsection-6 was used in place of upstreamsection-1 as the upstream A/F fluctuation compensation section.

(4) Evaluation

The oxygen adsorption performance of the upstream A/F fluctuation compensation section, and the exhaust gas purification performance of the exhaust gas purifying catalyst were evaluated. The results are summarized in Table 1 and FIG. 7 together with other results.

Evaluation Method

The evaluation in each of the above examples was conducted according to the following method.

1. Measurement of Physical Property

The Pt particle size after the endurance test was calculated, using the following Scherrer's equation, from the half-width of the Pt diffraction peak in a powder X-ray diffraction pattern that was obtained by XRD measurement conducted on a coat powder scraped off the honeycomb: Particle size=$K\lambda/((\beta \cos \theta)$ (where K is a constant of 0.94, $\lambda$ is the wavelength of the X-ray, $\beta$ is the half-width [rad] (which is attributed to the Pt particle size), for which 1.5405 was used, and $\theta$ is an angle). As the XRD measurement device, RINT2000 (CuKα, output: 40 KV, 40 mA), which is manufactured by Rigaku Corporation, was used.

2. Endurance Test

An endurance test was conducted at 1000° C. for 3 hours while passing the model gases that are shown in the following gas composition 1 over a fixed catalyst bed alternately every 5 minutes. The gas flow rate at this time was set to 5 L/min. the upstream and downstream sections of each Comparative Example and Example were combined along the flow direction in the catalyst when the endurance test was conducted.

Gas Composition 1

Rich: 30 ppm $SO_2$+0.1% NO+0.8% $O_2$+0.65% CO+0.1% $C_3H_6$+10% $CO_2$+3% $H_2O$ Lean: 30 ppm $SO_2$+0.1% NO+0.6% $O_2$+0.65% CO+0.1% $C_3H_6$+10% $CO_2$+3% $H_2O$ 3. Purification Performance Evaluation Test The temperature was increased at 25° C./min while passing a model gas having the composition 2 below through the fixed catalyst bed, and the temperature at which 50% of $C_3H_6$ was purified (which is abbreviated to "HC-T50") was defined as an index of the activity. The gas flow rate at this time was set to 30 L/min. upstream and downstream portion of each Comparative Example and Example were combined along the flow direction in the catalyst when the evaluation was made.

Gas Composition 2

0.15% NO+0.7% $O_2$+0.65% CO+0.1% $C_3H_6$+10% CO+3% $H_2O$

4. Evaluation of the Oxygen Adsorption Capacity Performance

Using the same device as used for the purification performance evaluation test, gases were introduced (10 L/min) in the sequence of 1% $O_2/N_2$ (30 minutes)→($N_2$ purge)→2% $CO/N_2$ (30 minutes), 600° C. (bed temperature). The amount of adsorbed oxygen was calculated from the amount of $CO_2$ that was generated with consumption of oxygen from the oxygen adsorbent when the CO gas was introduced, and defined as oxygen adsorption capacity. To evaluate oxygen adsorption performance, only the upstream portion of the catalyst was used.

TABLE 1

| | LOS content [(wt %)] | oxygen adsorption capacity [($O_2$-mol/g)] | HC-T50 [(° C.)] | Pt-XRD Particle size [(nm)] |
|---|---|---|---|---|
| Comparative Example 1 | 0 | 0.40 | 368 | 18.2 |
| Example 1 | 25 | 0.81 | 342 | 12.1 |
| Example 2 | 50 | 1.10 | 330 | 8.5 |
| Example 3 | 75 | 1.43 | 378 | 13.5 |
| Comparative Example 2 | 100 | 1.81 | 381 | 22.7 |
| Comparative Example 3 | 50 | 1.09 | 395 | 21.2 |

From Table 1 and FIG. 7, it can be understood that, in the case of the oxygen adsorbents that were produced in Examples 1 to 3 and the exhaust gas purifying catalysts that use the resulting oxygen adsorbents, sintering of Pt in the downstream section is significantly suppressed in the endurance test using a sulfur oxide-containing atmosphere that fluctuated between rich and lean states as compared with the oxygen adsorbents of Comparative Examples 1 to 3 and the exhaust gas purifying catalysts that use the oxygen adsorbents of Comparative Examples 1 to 3, which indicates that the oxygen adsorbents that were produced in Examples 1 to 3 and the exhaust gas purifying catalysts that use the oxygen adsorbents have higher catalytic performance than oxygen adsorbents and exhaust gas purifying catalysts in which LOS is used singly or is not used.

The invention claimed is:

1. An oxygen adsorbent comprising:
   $Ln_2O_2SO_4$, wherein Ln represents a rare earth element; and
   a ceria composite oxide including a solid solution of Ce, Zr, O and a rare earth element other than Ce,
   wherein the concentration of the ceria composite oxide is 40 to 60% by mass with respect to the total amount of the $Ln_2O_2SO_4$ and the ceria composite oxide, such that the oxygen adsorbent adsorbs oxygen and resists sulfur poisoning in an environment that contains sulfur oxides.

2. The oxygen adsorbent according to claim 1, wherein the $Ln_2O_2SO_4$ is mixed with the ceria composite oxide.

3. The oxygen adsorbent according to claim 1, wherein Ln is La.

4. The oxygen adsorbent according to claim 1, further comprising one or more elements that are selected from a group that consists of Pt, Pd, Rh, and Fe and that are supported thereon.

5. An exhaust gas purifying catalyst comprising:
   an oxygen adsorbent according to claim 1.

6. The exhaust gas purifying catalyst according to claim 5, wherein the oxygen adsorbent is provided on an upstream side of the exhaust gas purifying catalyst.

7. A method for producing an oxygen adsorbent, comprising:
   mixing $Ln_2O_2SO_4$, wherein Ln represents a rare earth element; and
   a ceria composite oxide including a solid solution of Ce, Zr, O and a rare earth element other than Ce,
   wherein the concentration of the ceria composite oxide is 40 to 60% by mass with respect to the total amount of the $Ln_2O_2SO_4$ and the ceria composite, such that the oxygen adsorbent adsorbs oxygen and resists sulfur poisoning in an environment that contains sulfur oxides.

8. An exhaust gas purifying catalyst, comprising:
   an oxygen adsorbent, the oxygen adsorbent including $Ln_2O_2SO_4$, wherein Ln represents a rare earth element; and
   a ceria composite oxide,
   wherein the concentration of the ceria composite oxide is 40 to 75% by mass with respect to the total amount of the $Ln_2O_2SO_4$ and the ceria composite oxide, such that the oxygen adsorbent adsorbs oxygen and resists sulfur poisoning in an environment that contains sulfur oxides, and
   wherein a $NO_x$ occluding material and a catalytically active component are supported on the oxygen adsorbent.

9. The exhaust gas purifying catalyst according to claim 8, wherein the $NO_x$ occluding material is at least one chosen from alkaline metals, alkaline-earth metals, and rare earth elements, and the catalytically active component is at least one chosen from Pt, Pd, Rh, and Ir.

\* \* \* \* \*